US012587696B2

(12) United States Patent　　　(10) Patent No.:　US 12,587,696 B2
Yadav et al.　　　　　　　　　　　　(45) Date of Patent:　　　Mar. 24, 2026

(54) PROCESSING A VIDEO SUBMISSION PACKAGE FOR GOING LIVE ON A MEDIA PLATFORM

(71) Applicant: Google LLC, Mountain View, CA (US)

(72) Inventors: Vivek Yadav, Bangalore (IN); Neha Jain, Bangalore (IN); Sambit Padhi, Bangalore (IN); Paul Alexander Charron, Mission Viejo, CA (US)

(73) Assignee: Google LLC, Mountain View, CA (US)

( * ) Notice: Subject to any disclaimer, the term of this patent is extended or adjusted under 35 U.S.C. 154(b) by 121 days.

(21) Appl. No.: 18/183,741

(22) Filed: Mar. 14, 2023

(65) Prior Publication Data

US 2024/0314377 A1　　Sep. 19, 2024

(51) Int. Cl.
*H04N 21/25*　　　(2011.01)
*H04L 65/60*　　　(2022.01)
*H04N 21/45*　　　(2011.01)
*H04N 21/475*　　(2011.01)

(52) U.S. Cl.
CPC ............. *H04N 21/25* (2013.01); *H04L 65/60* (2013.01); *H04N 21/4524* (2013.01); *H04N 21/4756* (2013.01)

(58) Field of Classification Search
CPC . H04N 21/25; H04N 21/4524; H04N 21/4756
See application file for complete search history.

(56) References Cited

U.S. PATENT DOCUMENTS

| | | | |
|---|---|---|---|
| 9,965,131 B1 * | 5/2018 | McInerny | ............. G06F 40/117 |
| 11,134,319 B1 | 9/2021 | Wyatt et al. | |
| 11,308,074 B1 | 4/2022 | Wyatt et al. | |
| 2011/0296536 A1 * | 12/2011 | Muller | ................... G06F 16/40 |
| | | | 726/30 |
| 2015/0046938 A1 | 2/2015 | Qian et al. | |
| 2023/0008023 A1 * | 1/2023 | Paini | ................... G06V 10/764 |

OTHER PUBLICATIONS

International Search Report and Written Opinion for PCT Application No. PCT/US2024/019987, mailed on Jun. 5, 2024, 15 pages.

* cited by examiner

*Primary Examiner* — Kunal Langhnoja
(74) *Attorney, Agent, or Firm* — Brake Hughes Bellermann LLP

(57) ABSTRACT

According to an aspect, a method includes receiving an availability resource from a first computing device associated with a studio entity, where the availability resource includes information about a media content item to be available on a media platform. The method includes storing the information of the availability resource in a database and receiving a package submission from a second computing device associated with a post-production house (PPH) entity, where the package submission includes media manifest core (MMC) data and one or more media assets associated with the media content item. The method includes executing a plurality of processing operations, including an error operation, on the package submission, using the availability resource and/or the MMC data, and, in response to determining that the error operation has resulted in an error, transmitting an error notification to the first computing device and/or the second computing device.

17 Claims, 5 Drawing Sheets

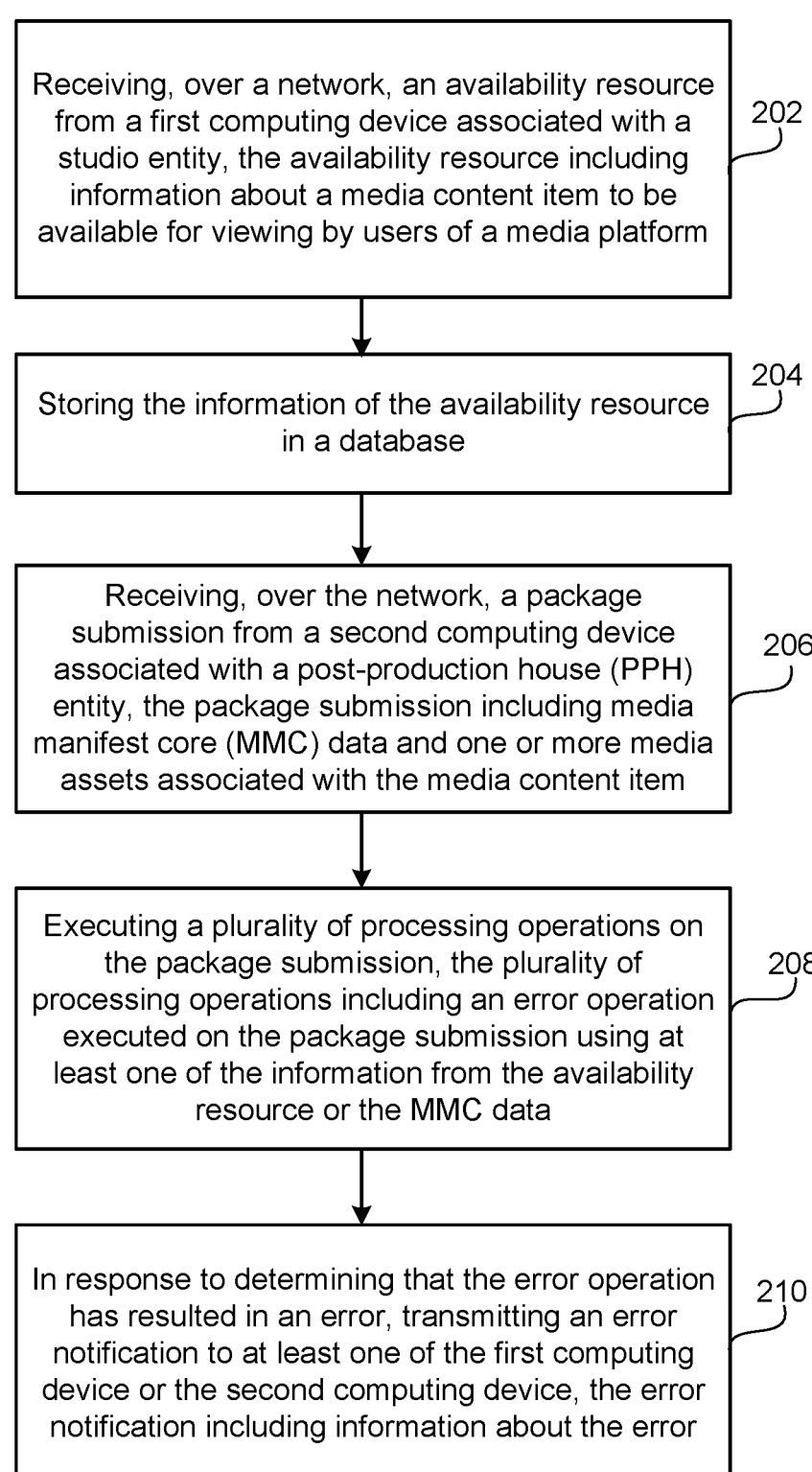

200

Receiving, over a network, an availability resource from a first computing device associated with a studio entity, the availability resource including information about a media content item to be available for viewing by users of a media platform    202

Storing the information of the availability resource in a database    204

Receiving, over the network, a package submission from a second computing device associated with a post-production house (PPH) entity, the package submission including media manifest core (MMC) data and one or more media assets associated with the media content item    206

Executing a plurality of processing operations on the package submission, the plurality of processing operations including an error operation executed on the package submission using at least one of the information from the availability resource or the MMC data    208

In response to determining that the error operation has resulted in an error, transmitting an error notification to at least one of the first computing device or the second computing device, the error notification including information about the error    210

FIG. 2

PROCESSING A VIDEO SUBMISSION PACKAGE FOR GOING LIVE ON A MEDIA PLATFORM

BACKGROUND

According to some conventional approaches, the rate at which video content achieves its target date for going live on a streaming platform is relatively low. For example, the streaming platform may receive a video package such as a new movie or a new episode from an outside entity (e.g., a post-production house), and the streaming platform may attempt to publish the new video content on the streaming platform by a predetermined target date so that users can stream and/or download the new video content by the target date. However, the video package may include one or more errors that may be required to be fixed before the video content is live on the streaming platform, which, in some examples, may cause the video content to be published after the target date. In addition, the processing of the video package may involve a number of human touch points, which can also introduce errors and delays into the workflow of publishing new video content on the streaming platform.

SUMMARY

In some aspects, the techniques described herein relate to a method including: receiving, over a network, an availability resource from a first computing device associated with a studio entity, the availability resource including information about a media content item to be available for viewing by users of a media platform; storing the information of the availability resource in a database; receiving, over the network, a package submission from a second computing device associated with a post-production house (PPH) entity, the package submission including media manifest core (MMC) data and one or more media assets associated with the media content item; executing a plurality of processing operations on the package submission, the plurality of processing operations including an error operation executed on the package submission using at least one of the information from the availability resource or the MMC data; and in response to determining that the error operation has resulted in an error, transmitting an error notification to at least one of the first computing device or the second computing device, the error notification including information about the error.

In some aspects, the techniques described herein relate to a non-transitory computer-readable medium storing executable instructions that when executed by at least one processor cause the at least one processor to execute operations, the operations including: receiving, over a network, an availability resource from a first computing device associated with a studio entity, the availability resource including information about a media content item to be available for viewing by users of a media platform; storing the information of the availability resource in at least one of a plurality of database tables; receiving, over the network, a package submission from a second computing device associated with a post-production house (PPH) entity, the package submission including media manifest core (MMC) data and one or more media assets associated with the media content item; executing a plurality of processing operations on the package submission, the plurality of processing operations including an error operation executed on the package submission using at least one of the information from the availability resource or the MMC data; and in response to execution of one of the plurality of processing operations, providing, over a network, a status message about a status of the package submission.

In some aspects, the techniques described herein relate to an apparatus including: at least one processor; and a non-transitory computer-readable medium storing executable instructions that cause the at least one processor to: receive, over a network, an availability resource from a first computing device associated with a studio entity, the availability resource including information about a media content item to be available for viewing by users of a media platform; store the information of the availability resource in a database; receive, over the network, a package submission from a second computing device associated with a post-production house (PPH) entity, the package submission including media manifest core (MMC) data and one or more media assets associated with the media content item; execute a plurality of processing operations on the package submission, the plurality of processing operations including an error operation executed on the package submission using at least one of the information from the availability resource or the MMC data; and in response to determining that the error operation has resulted in an error, transmit an error notification to at least one of the first computing device or the second computing device, the error notification including information about the error.

The details of one or more implementations are set forth in the accompanying drawings and the description below. Other features will be apparent from the description and drawings, and from the claims.

BRIEF DESCRIPTION OF THE DRAWINGS

FIG. 2 illustrates a flowchart depicting example operations of a system for validating media content before the media content is available for streaming to users of the media platform according to an aspect.

DETAILED DESCRIPTION

Figure 1A:
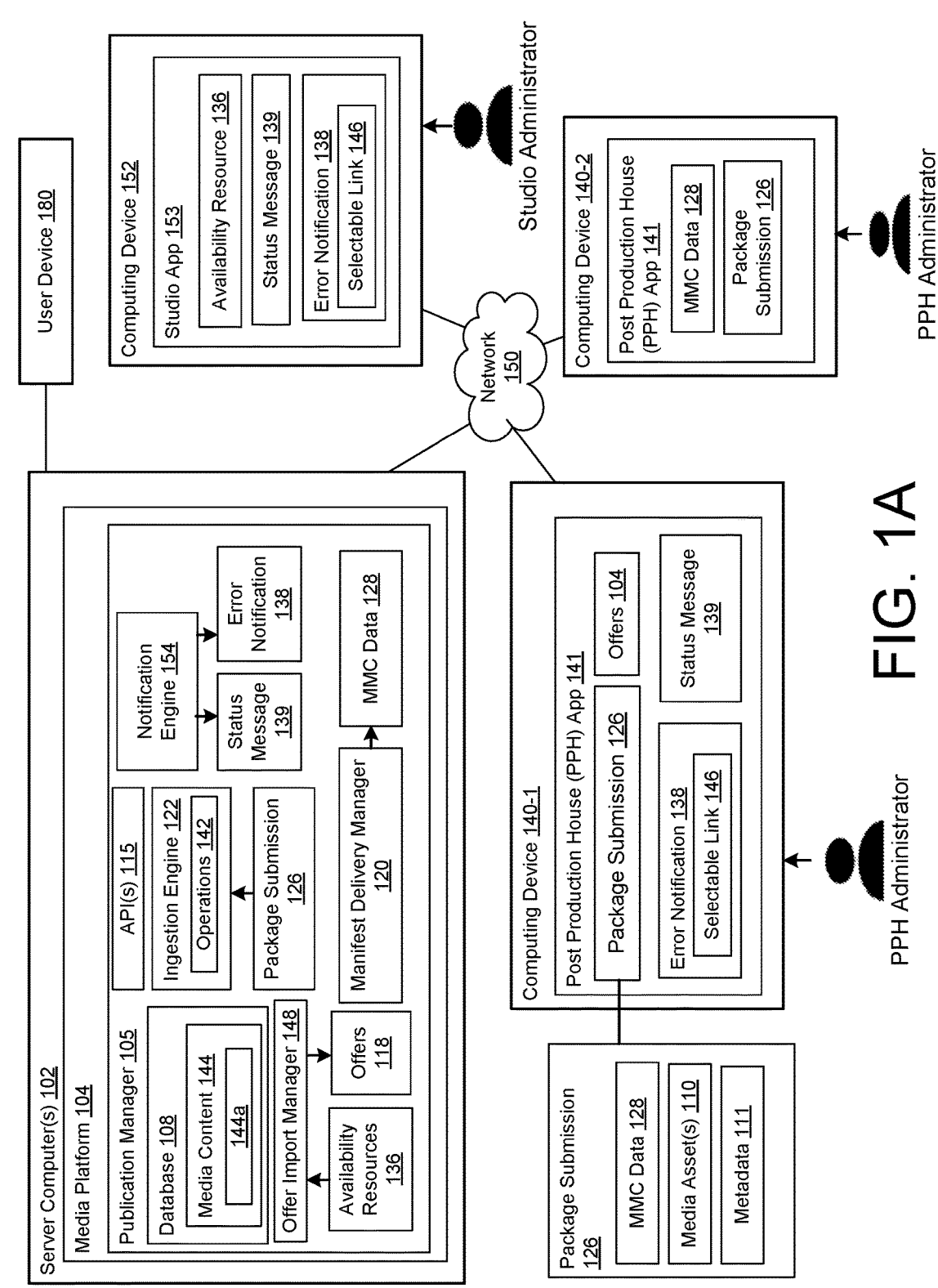
FIG. 1A illustrates a system for validating media content before the media content is available for streaming to users of the media platform according to an aspect.

This disclosure relates to a system for increasing a hit rate at which media content (e.g., transactional video on demand (TVOD) content) achieves their target release date on a media platform. The target release date is the day at which the media content is scheduled to be available for viewing by users of a media platform, and the hit rate is the rate at which media content is live by the target release date. In some examples, when the media content is available for viewing by the users of the media platform, the media content is considered live on the media platform or the media content is considered published to the media platform. Once media content is live on the media platform, a user may use their computing device to view, rent, or purchase the media content.

The system includes a publication manager configured to reduce the number of errors and delays associated with publishing media content on the media platform such that the media content has an increased rate of achieving their target release date. For example, in response to an indication that the media platform will host a new media content item (e.g., receipt of an availability resource ("avail") from a studio entity), the publication manager may enable a post-production house (PPH) entity to quickly submit a package submission, which includes the media assets (e.g., the relevant video/audio files), and the publication manager may process the package submission in a streamlined manner in which errors and/or status notifications are quickly notified to the relevant entities (e.g., the PPH entities, and, in some examples, and/or the studio entities). The publication manager may remove manual touchpoints in the workflow, automate operations on the media content to check for errors, and/or provide a communication protocol to automate interactions between the entities, which, as a result, may increase the hit rate while decreasing resources (e.g., operational intervention teams, engineers, etc.) that are conventionally used to alleviate problems that may prevent the media content from going live by the target release date.

There may be a number of different entities associated with publishing media content on a media platform such as studio entities that create the media content, PPH entities that may manage the final processing and/or distribution of the media content, and the media platform itself that provides the media content for viewing by users of the media platform. The publication manager may implement and execute one or more application programming interface(s) (APIs)) that enable the media platform and computing device associated with the studio and PPH entities to communicate with each other to facilitate the processing of the package submission and/or the transmission of error notifications and status messages about the status of the media content before the media content goes live.

In further detail, the publication manager may receive, over a network, an availability resource ("avail") from a computing device associated with a studio entity. The availability resource may include a computer resource file (e.g., a spreadsheet file) that includes information that provides permission to offer a media content item on the media platform. The availability resource may include the title of the media content item, a target release date, pricing information, and/or other information related to the media content item. In response to the availability resource being received by the publication manager, the publication manager may update one or more database tables with the information from the availability resource. Based on the availability resources stored in the database table(s), the media platform may generate offers that correspond to the availability resources stored in the database tables.

The publication manager may quickly provide, via the API(s), an offer about the media content item to a PPH entity so that the PPHs can fulfill the offer (e.g., via the submission of a package submission). In other words, the publication manager may provide a mechanism that allows the system to quickly ingest availability resources (e.g., avails) from studio entities and provide offers, corresponding to the availability resources, to the PPHs so that the PPHs can fill those orders. A PPH's computing device may periodically retrieve, via the API(s), the offers stored on the media platform. An offer may include information about the underlying media content item such as the title, the transaction type(s) (e.g., rental/purchase), the format, transaction start time and end time, and/or other information associated with the offer. In some examples, a PPH application, executing on a PPH administrator's computing device, may use the API(s) to retrieve offers from the media platform. In some examples, the offers may be directly injected into the PPH application. In this manner, as soon as a new availability resource is ingested by the publication manager, the PPH application may retrieve and display information about the corresponding offer and other offers provided by the media platform, thereby providing faster delivery of offers to the PPHs.

To fulfill an offer, the PPH's administrator may submit a package submission, and the publication manager may receive, over a network, the package submission via the API(s). In other words, the PPH administrator may use their computing device to submit the package submission to the media platform. The package submission may include a media manifest core (MMC) data, one or more media assets that includes the video and/or audio files of the media content, and metadata about the media content. In some examples, the MMC data includes a list of the media asset(s) included in the package submission. In some examples, the MMC data includes a computer file. In some examples, the MMC data include an extensible markup language (XML) file. In some examples, the metadata includes metadata about the title of the media content.

In response to the receipt of the package submission, the publication manager may execute a plurality of operations, including error operations, to determine whether the package submission includes one or more errors, and, if so, may notify, via the APIs, the studio entity and/or the PPH entity with error notifications with detailed information to enable the studio entity and/or the PPH entity to correct the errors without re-submitting the package submission. According to some conventional approaches, package submissions may include errors relating to proper identifiers between the series and the episode, errors relating to language and/or ratings, or other types of errors. However, the publication manager may automatically perform one or more error check operations on the package submission, and, if one of the error check operations fails, the publication manager may transmit an error message with detailed information about the error to enable the studio entity and/or the PPH entity to correct without resubmission the package submission. In some examples, in response to execution of an operation of the plurality of operations, the publication manager may provide, via the APIs, a status message to the studio entity and/or the PPH entity about the status of the package submission, which may reduce the intervention rate.

After the publication manager has validated the package submission, the package submission, including the MMC data, may be stored in an ingestion database. In some examples, other PPH entities may transmit a query, via the API(s), to the publication manager to obtain validated MMC data from the ingestion database to be used as a template for similar media assets. For example, a PPH entity may receive recent, validated MMC for media content. The PPH entity may use the recent, validated MMC data to attach new media assets without re-creating the MMC data. In this manner, the publication manager may increase the data accuracy of package submissions by enabling the PPH application to retrieve and download validated MMC data that can be used for similar media content and may avoid the need for the PPH entity to construct new MMC data each time they fulfill an offer. Also, by enabling manifest retrieval from the media platform, in some examples, superset rule violations and series hierarchy corruption may be minimized and/or avoided. These and other features are further explained with reference to the figures.

Figure 1B:
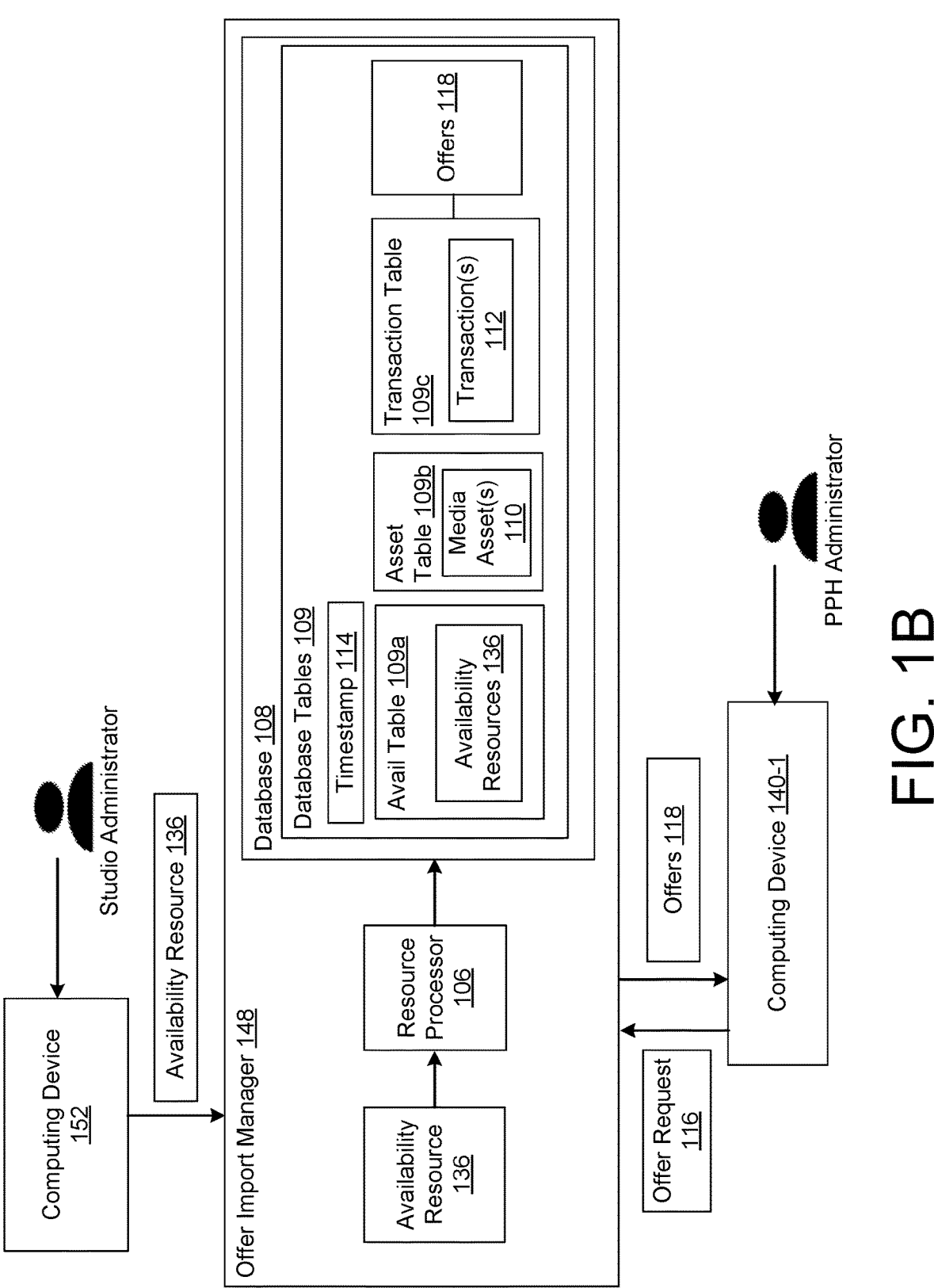
FIG. 1B illustrates an example of an offer import manager of the system of FIG. 1A according to an aspect.
Figure 1C:
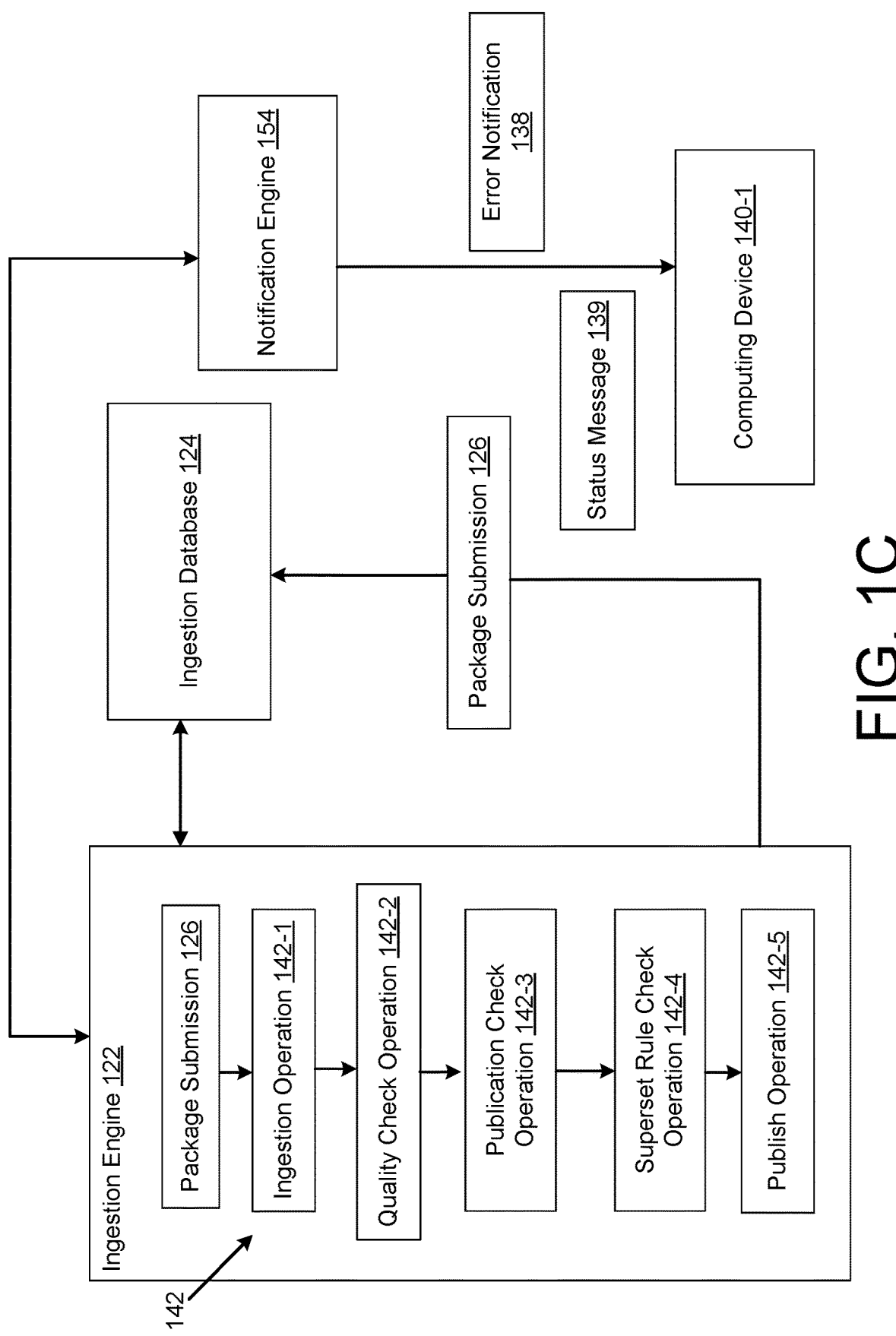
FIG. 1C illustrates an example of an ingestion engine and a notification engine of the system of FIG. 1A according to an aspect.

FIGS. 1A through 1C illustrate a system 100 for validating media content 144 before the media content 144 is available for streaming to users of the media platform 104. FIG. 1A illustrates an overview of the system 100. The system 100 includes a media platform 104 executable by one or more server computer(s) 102. The media platform 104 includes a database 108 storing media content 144 that can be streamed or downloaded by users of the media platform 104. The media content 144 may include a plurality of media content items 144a, each of which may correspond to a movie, a television show, live content, or an episode of a series, etc. A particular instance of media content 144 may be referred to as a media content item 144a. The media content 144 may include transactional video on demand (TVOD) content. In some examples, when the media content 144 is available for viewing by the users of the media platform 104, the media content 144 is considered live on the media platform 104 or the media content 144 is considered published to the media platform 104.

After a media content item 144a is live (e.g., published) on the media platform 104, a user device 180 may stream the media content item 144a from the media platform 104. In other words, once the media content item 144a is live on the media platform 104, a user may use their user device 180 to view, rent, or purchase the media content item 144a. Streaming (or playback) of the media content item 144a may refer to the transmission of the contents of a video file (e.g., media assets 110) from the media platform 104 to the user device 180 that displays the contents of the video file. In some examples, streaming (or playback) of the media content item 144a may refer to a continuous video stream that is transferred from one place to another place in which a received portion of the video stream is displayed while waiting for other portions of the video stream to be transferred. In some examples, after the media content item 144a is live, the user device 180 may download the contents of the video file, and the video file is stored on the user device 180.

The media content item 144a is associated with a target release date where the media content item 144a is scheduled to be available for viewing by the users of the media platform 104, and the hit rate is the rate at which media content item 144a is live by the target release date. According to some conventional approaches, the media content item 144a may not be available for viewing by the target release date due to communication delays and/or processing errors associated with a package submission 126 that corresponds to the media content item 144a.

However, the media platform 104 includes a publication manager 105 configured to execute an efficient computer-implemented process for enabling the media content item 144a to be published on the media platform 104. The publication manager 105 may include an offer import manager 148 configured to receive availability resources 136 from studio entities and provide offers 118, corresponding to the availability resources 136, to PPH entities. In some examples, an available resource 136 is, includes, or is associated with an avail. An avail is a term (e.g., an industry term) for information about the time, location, and rules (e.g., business rules) relating to offering an asset (e.g., a media content item 144a).

Figure 1D:
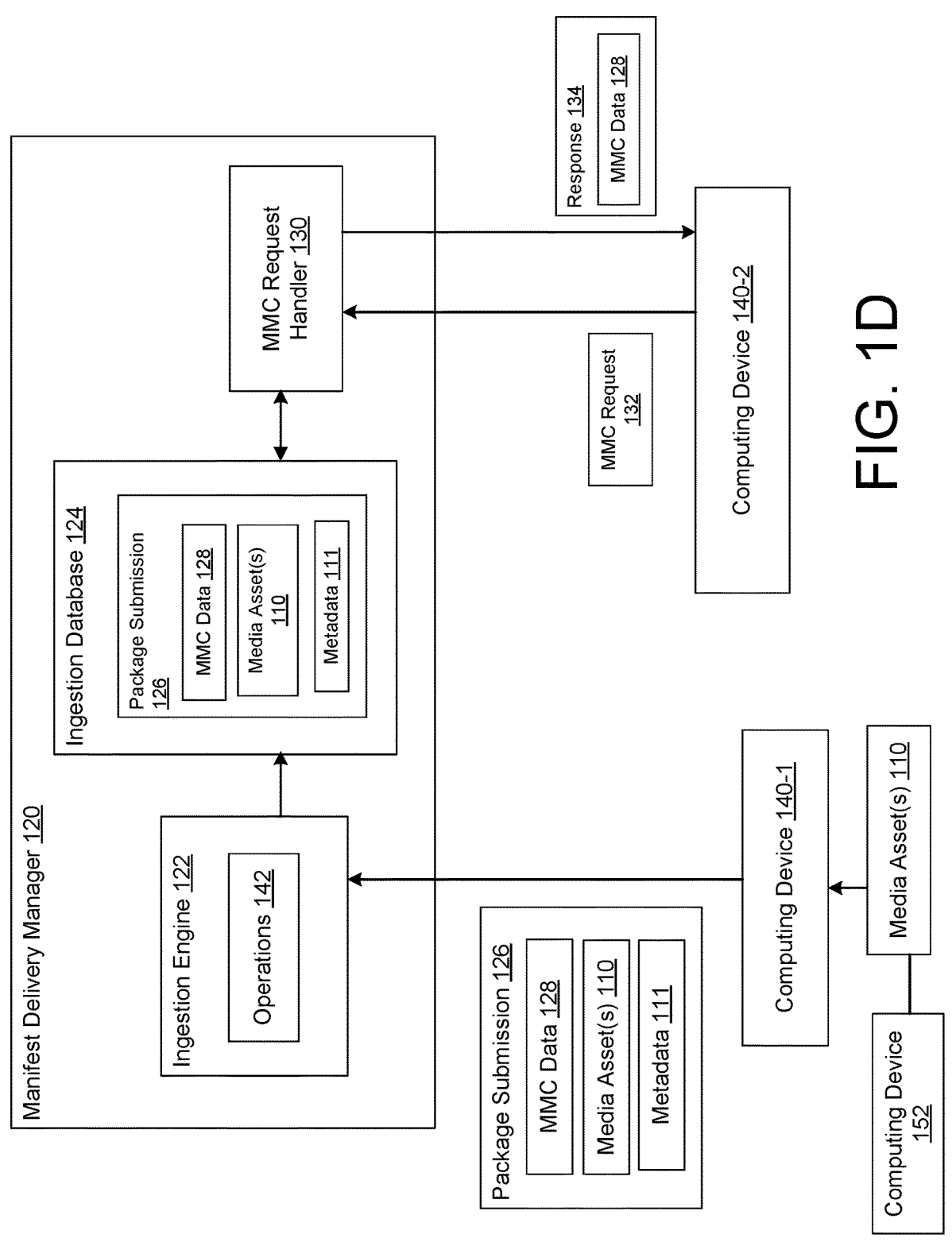
FIG. 1D illustrates an example of a manifest delivery manager of the system of FIG. 1A according to an aspect.

FIG. 1B illustrates an aspect of the offer import manager 148. In response to the offers 118, the PPH entities may submit package submissions 126 to the media platform 104. The publication manager 105 includes an ingestion engine 122 configured to process the package submissions 126 according to a plurality of operations 142. While the package submissions 126 are being processed, the publication manager 105 includes a notification engine 154 configured to generate status messages 139 and error notifications 138 about the media content item 144a. FIG. 1C illustrates aspects of the ingestion engine 122 and the notification engine 154. The publication manager 105 may include a manifest delivery manager 120 configured to provide media manifest core (MMC) data 128 to PPH entities. The MMC data 128 may include recent, validated MMC data, and the PPH entity may use the recent, validated MMC data to attach new media assets 110 without re-creating the MMC data 128. FIG. 1D illustrates aspects of the manifest delivery manager 120.

The publication manager 105 is configured to reduce the number of errors and delays associated with publishing media content 144 on the media platform 104. Before the media content 144 is live on the media platform 104, the publication manager 105 may facilitate the workflow of processing the media content 144 such that the media content 144 can be available to users of the media platform 104 by the target release date. For example, the publication manager 105 may remove manual touchpoints in the workflow, automate operations on the media content 144 to check for errors, and/or enable a communication protocol to automate interactions between the various entities (e.g., studios, PPHs, etc.), which can increase the hit rate while decreasing resources (e.g., operational intervention teams, engineers, etc.) that are conventionally used to alleviate issues that may prevent the media content 144 from going live.

The publication manager 105 includes one or more application programming interfaces (APIs) 115 configured to enable the publication manager 105 to communicate with a computing device 140-1 associated with a post-production house (PPH) entity, and a computing device 152 associated with a studio entity. The computing device 152 may include a studio application 153 configured to communicate with the publication manager 105 via the API(s) 115. A studio administrator may use the studio application 153 to generate an availability resource 136, which is transmitted to the publication manager 105 via the API(s) 115. In some examples, the studio application 153 may display status messages 139 and/or error notifications 138 associated with publishing the media content item 144a. In some examples, the studio application 153 is a native application installed on an operating system of the computing device 152. In some examples, the studio application 153 is a web application or a webpage that defines an interface used to generate the availability resource 136.

The availability resource 136 may include a computer resource file (e.g., a spreadsheet file) that includes information that provides permission to offer a media content item 144a on the media platform 104. In some examples, the availability resource 136 includes any information included within an Entertainment Merchants Association (EMA) format. The availability resource 136 may include the title of the media content item 144a, a target release date (e.g., start time), end time in which the media assets 110 would no longer be available, pricing information, and/or other information related to the media content item 144a. The other information may encompass a wide variety of information such as asset language, territory, license type, format profile, one or more identifiers (e.g., edit ID, alt ID, content ID, avail ID, UV ID, DMA ID, etc.), announce date, release year, rental duration, caption included, series title, season number, episode number, episode count, season count, series identifier, and/or episode identifier, etc.

In some examples, the availability resource 136 includes a computer file that includes information about the media content item 144a to be offered for viewing on the media platform 104. In some examples, the availability resource 136 includes a spreadsheet file that includes information about the media content item 144a to be offered for viewing on the media platform 104. In some examples, an available resource 136 is, includes, or is associated with an avail. An avail is a term (e.g., industry term) for information about the time, location, and rules (e.g., business rules) relating to offering an asset (e.g., a media content item 144a).

In response to the availability resource 136 being received by the publication manager 105 and/or the offer import manager 148, the offer import manager 148 may update one or more database tables 109 of the database 108 with the information from the availability resource 136. Based on the availability resources 136 stored in the database tables 109, the offer import manager 148 may generate offers 118 that correspond to the availability resources 136 stored in the database tables 109.

Referring to FIG. 1B, the offer import manager 148 receives the availability resource 136 from the computing device 152 associated with the studio administrator. The offer import manager 148 may include a resource processor 106 configured to process the availability resource 136 and store the information from the availability resource 136 in the database tables 109. In some examples, the resource processor 106 may determine whether one or more portions of information is missing from the availability resource 136, and, if so, may generate an error notification 138, which is transmitted to the computing device 152. In some examples, the resource processor 106 may obtain an avail template that identifies which fields are required (and, in some examples, which fields are optional), and determines whether the availability resource 136 is missing any required information. For example, if the availability resource 136 does not include the title, price information, or other types of information, the resource processor 106 may generate an error notification 138 that describes the missing information, and the error notification 138 may be transmitted to the studio entity. In response to the error notification 138, the studio administrator may resubmit the availability resource 136 and/or submit only the missing information.

In response to the availability resource 136 being processed (e.g., successfully processed) by the resource processor 106, the resource processor 106 may store the information from the availability resource 136 in one or more database tables 109. The database tables 109 may include an availability table 109a, an asset table 109b, and/or a transaction table 109c. Although three database tables 109 are depicted, the database tables 109 may include one database table, two database tables, or any number greater than three database tables. A database table 109 may be a dataset with columns and rows. In some examples, the database tables include one or more relational databases.

The availability table 109a may store information from the availability resources 136 (e.g., information about the avails). The asset table 109b may store information about media assets 110 associated with the availability resources 136. The transaction table 109c may store information about transaction 112 corresponding to the media assets 110. A transaction 112 corresponds to an offer 118. In other words, an offer 118 may be represented by a transaction 112. One or more transactions 112 may correspond to an available resource 136. In some examples, in response to a new availability resource 136, the resource processor 106 may update the availability table 109a with information from the availability resource 136. In some examples, the resource processor 106 may update at least a portion the asset table 109b and/or the transaction table 109c with information from the availability resource 136. In some examples, the asset table 109b and the transaction table 109c are updated with information from MMC data 128 (e.g., after the package submission 126 is received).

In some examples, the database tables 109 include a timestamp 114. The timestamp 114 may include date and/or time information that indicates when the database tables 109 were last updated. In some examples, each database table 109 is associated with a separate timestamp 114. In response to receipt of a new availability resource 136, the resource processor 106 may update the availability table 109a (and, in some examples, the asset table 109b and/or the transaction table 109c), and the resource processor 106 may update the timestamp 114 with the current date and/or time information. Each time the database tables 109 are updated, the resource processor 106 may update the timestamp 114. For example, the database tables 109 may be updated again after the MMC data 128 is received via the package submission, which would cause the timestamp 114 to be updated again.

The availability table 109a may store the studio identifier, the country (e.g., territory), language, submission time, the title, assets identifier (e.g., a logical asset ID (ALID)), and/or the series title and season title for television episodes. The asset table 109b may include the title, a title identifier (e.g., title EIDR), an edit identifier (e.g., edit EIDR), release date, run length, content rating, sequence information for television episodes, and/or metadata about the parent series and season. EIDR is the industry-curated public registry of media assets 110, which provides a plurality of identifiers (e.g., unique identifiers) for media assets 110. The transaction table 109c may store the transaction type (e.g., rental or purchase), format (e.g., high definition (HD), ultra-high definition (UHD), and/or standard definition (SD)), transaction start time and end time (e.g., the time when the title is available for purchase or rental) pricing type (e.g., wholesale and/or minimum retail price), retail price, rental duration, localization type, and/or watch type, etc.

The offer import manager 148 may quickly provide, via the API(s) 115, an offer 118 about the media content item 144a to a PPH entity so that a PPH entity can fulfill the offer 118 (e.g., via the submission of a package submission 126). The offer 118 that is provided to the PPH entity may include information from the availability table 109a and/or the transaction table 109c. The offer import manager 148 may provide a mechanism that allows the system 100 to quickly ingest availability resources 136 (e.g., avails) from studio entities and provide offers 118, corresponding to the availability resources 136, to the PPH entities so that the PPH entities can fill those offers 118. The computing device 140-1 may include a PPH application 141 configured to communicate with the publication manager 105 via the API(s) 115. In some examples, the PPH application 141 is a native application installed on an operating system of the computing device 140-1. In some examples, the PPH application 141 is a web application or a webpage that defines an interface used to communicate with the publication manager 105. In some examples, the PPH application 141 may also enable the PPH administrator to submit a package submission 126 and to display error notifications 138 and status messages 139 about the package submissions 126.

In some examples, the PPH application 141 may periodically generate and send an offer request 116, which causes the PPH application 141 to receive one or more offers 118 (e.g., every X period of time). In some examples, an offer request 116 is associated with time interval (e.g., between timestamp T1 and timestamp T2), and the offer import manager 148 may retrieve the offers 118 that were updated between timestamp T1 and timestamp T2. For example, the offer import manager 148 may use the information from the timestamp 114 to pull the relevant offers 118 between timestamp T1 and timestamp T2. The PPH application 141 may periodically retrieve, via the API(s) 115, the offers 118 stored on the media platform 104. In response to the offer request 116, the offer import manager 148 may obtain the offers 118 to be fulfilled by the PPH entity. For example, the offer import manager 148 may query the transaction table 109*c* to obtain the currently pending (and unfilled) offers 118, and may transmit, over the network 150, information about the offers 118 to the PPH application 141 on the computing device 140-1.

An offer 118 may include information about the underlying media content item 144*a* such as the title, the transaction type(s) (e.g., rental/purchase), the format, transaction start time and end time, and/or other information associated with the offer 118. In some examples, the offers 118 may be directly injected into the PPH application 141. In this manner, as soon as a new availability resource 136 is ingested by the offer import manager 148, the PPH application 141 may retrieve and display information about the corresponding offer 118 and other offers 118 provided by the media platform 104, thereby providing faster delivery of offers 118 to the PPH entities.

To fulfill an offer 118, the PPH's administrator may the PPH application 141 submit a package submission 126, and the publication manager 105 may receive, over the network 150, the package submission 126 via the API(s) 115. The package submission may include a media manifest core (MMC) data 128, one or more media assets 110 that includes the video and/or audio files of the media content item 144*a*, and metadata 111 about the media content item 144*a*. In some examples, the PPH entity may receive the media assets 110 from the corresponding studio entity. In some examples, the MMC data 128 includes a list of the media asset(s) 110 included in the package submission 126. In some examples, the MMC data 128 includes a metadata structure that provides relationships between media assets 110 and technical information about the media assets 110. In some examples, the MMC data 128 includes information about the inventory of media, including video, audio, text tracks, and/or image data (e.g., artwork). The MMC data 128 may include description of the parent video track, description of one or more audio tracks, metadata about subtitle tracks, and/or a description of the images. In some examples, the MMC data 128 includes one or more identifiers associated with the media assets 110.

In some examples, the MMC data 128 includes a plurality of fields relating to technical information about the audio and/or video tracks. For audio data, the MMC data 128 may include fields relating to audio track identifier, description, language, channels, encoding (e.g., codec, track reference, channel mapping), etc. For video data, the MMC data 128 may include fields relating to video track identifier, type, sub-type, encoding, codec, bit rate average, actual length, picture, aspect ratio, frame rate, active width pixels, active height pixels, width pixels, height pixels, subtitle track identifier, type, format type, language, container location (e.g., uniform resource locator (URL) for the corresponding file). For image data, the MMC data 128 may include image identifier, width, height, purpose, encoding, container location (e.g., a URL referencing the location of the file). In some examples, the MMC data 128 includes a computer file. In some examples, the MMC data 128 includes an extensible markup language (XML) file. In some examples, the metadata 111 includes metadata about the title of the media content item 144*a*.

Referring to FIG. 1C, in response to the receipt of the package submission 126, the ingestion engine 122 may execute a plurality of operations 142, including error operations, to determine whether the package submission 126 includes one or more errors. If so, the notification engine 154 may transmit an error notification 138 to the PPH application 141 (and, in some examples, the studio application 153), where the error notification 138 may include information to enable the studio entity and/or the PPH entity to alleviate the errors without re-submitting the package submission 126. In some conventional approaches, a package submission 126 may include errors relating to proper identifiers between the series and the episode, errors relating to language and/or ratings, or other types of errors.

The ingestion engine 122 may automatically perform one or more error check operations on the package submission 126, and, if one of the error check operations fails, the notification engine 154 may transmit an error notification 138 with detailed information about the error to enable the studio entity and/or the PPH entity to correct without re-submitting the package submission 126. In some examples, the error notification 138 includes a selectable link 146, when selected, causes a computing device (e.g., computing device 152, computing device 140-1, or computing device 140-2) to render a user interface to correct the error without causing resubmission of the package submission 126. In some examples, after the error is corrected via the user interface, the ingestion engine 122 is configured to repeat the operations 142 on the package submission 126. In some examples, after the error is corrected via the user interface, the ingestion engine 122 may repeat only the operation 142 that generated the error.

In some examples, the notification engine 154 may select one or more recipients of an error notification 138 based on the type of error notification. For example, the notification engine 154 may select the PPH entity that submitted the package submission 126 or the studio entity that created the media content item 144*a*, or both, which can depend on the type of error. In some examples, the notification engine 154 may transmit error notifications 138 to only the PPH entities (e.g., not the studio entities). In some examples, the notification engine 154 may transmit the error notifications 138 to the PPH entities and the studio entities. In some examples, a particular PPH entity (or a studio entity) may be associated with a plurality of recipients, and the notification engine 154 may select one or more recipients based on the type of error notification.

In some examples, in response to execution of an operation 142 of the plurality of operations 142, the notification engine 154 may provide, via the APIs 115, a status message 139 to the studio application 153 and/or the PPH application 141 about the status of the package submission 126, which may reduce the intervention rate. In some examples, the notification engine 154 may provide a status message 139 after each operation 142 is executed. In some examples, the notification engine 154 may provide a status message 139 for some operations 142 but not all operations 142 executed by the ingestion engine 122.

The operations 142 may include an ingestion operation 142-1. The ingestion operation 142-1 may include parsing the MMC data 128 and the metadata 111 in the package submission 126 and storing the information from the MMC data 128 and the metadata 111 in the database tables 109. In some examples, the ingestion engine 122 may update the asset table 109*b* and the transaction table 109*c* with the information from the MMC data 128 and the metadata 111. In some examples, the ingestion operation 142-1 may include checking whether one or more fields of the MMC data 128 are valid. In some examples, the ingestion operation 142-1 includes checking whether the language and the country is valid. In some examples, the ingestion engine 122 may compare portions of the MMC data with portions of the availability resource 136 stored in the availability table 109a to determine whether one or more fields of the MMC data 128 are valid.

If an error is detected during the ingestion operation 142-1, the notification engine 154 may transmit an error notification 138 to the PPH application 141 (and, in some examples, and/or the studio application 153). The error notification 138 may include detailed information about the error. For example, if the error relates to an incorrect language, a PPH administrator may use the PPH application 141 to update the language without requiring the PPH administrator to re-submit the package submission 126. In some examples, an error is detected during the ingestion operation 142-1 if one or more portions of the MMC data 128 (e.g., a language identified in one of the fields in the MMC data 128) is different from a corresponding portion of the availability resource 136. Also, a region (e.g., territory) may have a language requirement (e.g., publish only English language content in Australia), and the ingestion engine 122 detects that the language requirement is not achieved (e.g., the MMC data 128 specifies a different language than what is required by the language requirement), the notification engine 154 may transmit an error notification 138 that identifies the failed language requirement. If an error is not detected during the ingestion operation 142-1, the notification engine 154 may transmit and/or update a status message 139 indicating that the package submission 126 has successfully completed the ingestion operation 142-1.

The operations 142 may include a quality check operation 142-2. The quality check operation 142-2 may perform one or more quality checks on the information included in the package submission 126. In some examples, the quality check operation 142-2 includes a hierarchical check for episodic content to determine if a series identifier identified in the MMC data 128 corresponds to a series identifier identified in the information from the availability resource 136. For example, if the MMC data 128 indicates that the referenced episode belongs to a certain television series (e.g., Series "ABC"), the hierarchical check may involve determining whether that episode belongs to that television series by checking information from the availability resource 136. In some examples, the ingestion engine 122 may compare information in the availability table 109a to information in the MMC data 128 to determine whether the episode identifier and/or the series identifier identified in the MMC data 128 corresponds to the series identifier identified in the information from the availability resource 136.

If an error is detected during the quality check operation 142-2, the notification engine 154 may transmit an error notification 138 to the PPH application 141, and, in some examples, and/or the studio application 153. The error notification 138 may include detailed information about the error. For example, if the error relates to an incorrect series identifier, a PPH administrator may use the PPH application 141 to update the series identifier without requiring the PPH administrator to re-submit the package submission 126. In some examples, the error notification 138 identifies that the error is a hierarchy error, and the error notification 138 may indicate the series identifier that is associated with the media content item 144a in the package submission 126 and the series identifier that is associated with the previously provided content. In some examples, the previously provided content is available on the media platform 104 for streaming the previously provided content. If an error is not detected during the quality check operation 142-2, the notification engine 154 may transmit and/or update a status message 139 indicating that the package submission 126 has successfully completed the quality check operation 142-2.

In some examples, the operations 142 includes a publication check operation 142-3. The publication check operation 142-3 may include determining whether the language and/or rating fields are valid. In some examples, the publication check operation 142-3 may include determining whether one or more requirements are satisfied for publishing the media content item 144a. In some examples, the publication check operation 142-3 includes applying a territory rule to the package submission 126 to determine whether language of the media assets 110 is legally allowed in the territory. In some examples, the ingestion engine 122 may compare portions of the MMC data 128 with portions of the availability resource 136 stored in the availability table 109a to determine whether one or more fields of the MMC data 128 are valid.

If an error is detected during the publication check operation 142-3, the notification engine 154 may transmit an error notification 138 to the studio application 153 and/or the PPH application 141. The error notification 138 may include detailed information about the error. In some examples, the error notification 138 may indicate that the error relates to a publication template error. In some examples, the error notification 138 may indicate which territory rule was applied to the package submission 126 and/or which requirement was not met. In some examples, if the error relates to an incorrect language or rating, a PPH administrator may use the PPH application 141 to update the language or rating without requiring the PPH administrator to re-submit the package submission 126. If an error is not detected during the publication check operation 142-3, the notification engine 154 may transmit and/or update a status message 139 indicating that the package submission 126 has successfully completed the publication check operation 142-3.

The operations 142 may include a superset rule check operation 142-4. The superset rule check operation 142-4 may include determining whether or not an update to a package submission 126 removes existing content (e.g., previously provided content) from the package submission 126 (e.g., an update to a television series does not include any episodes from the series). If an error is detected during the superset rule check operation 142-4, the notification engine 154 may transmit an error notification 138 to the PPH application 141, and, in some examples and/or the studio application 153. The error notification 138 may include detailed information about the error. In some examples, the error notification 138 may indicate that the error is a superset rule error, and the error notification 138 may indicate a difference between one or more episodes that are present in the package submission 126 and the episodes that are present in previously provided content.

For example, if the error relates to a superset rule check violation, a PPH administrator may use the PPH application 141 to update the MMC data 128 without requiring the PPH administrator to re-submit the package submission 126. If an error is not detected during the superset rule check operation 142-4, the notification engine 154 may transmit and/or update a status message 139 indicating that the package submission 126 has successfully completed the superset rule check operation 142-4.

The operations 142 include a publish operation 142-5. The publish operation 142-5 includes publishing the media content item 144a to an ingestion database 124 such that the media content item 144a will be live at the target release date. The ingestion database 124 may be a portion of the database 108. In some examples, the ingestion database 124 is a portion of the database 108 that is separate from the database tables 109. For example, the ingestion engine 122 may update the catalog of media content 144 with the title of the media content item 144a along with the date when it will be live and/or price information about the media content item 144a. The notification engine 154 may transmit and/or update a status message 139 indicating that the package submission 126 has successfully completed the publish operation 142-5. In some examples, after completion of the publish operation 142-5, the package submission 126 is considered validated.

After the publication manager 105 has validated the package submission 126, the package submission 126, including the MMC data 128, the media asset(s) 110, and the metadata 111 may be stored in the ingestion database 124. As shown in FIG. 1D, the manifest delivery manager 120 may receive MMC requests 132 from PPH entities and provide responses 134 to the PPH entities, where the responses 134 may include recent, validated MMC data 128, which can be used as a template for other package submissions 126. For example, a PPH entity may use the recent, validated MMC data 128 to attach new media assets 110 without re-creating the MMC data 128. In this manner, the manifest delivery manager 120 may increase the data accuracy of package submissions 126 by enabling the PPH application 141 to retrieve and download validated MMC data 128 that can be used for similar media content and may avoid the need for the PPH entity to construct new MMC data 128 each time they fulfill an offer 118.

In FIG. 1B, a computing device 140-2 is associated with another PPH entity. The computing device 140-2 may also execute a PPH application 141, which is used to generate and transmit an MMC request 132 via the API(s) 115 to the manifest delivery manager 120. The MMC request 132 may include a studio name, series identifier (e.g., ALID), and/or a region. In response to receipt of the MMC request 132, an MMC request handler 130 may query the ingestion database 124 to identify MMC data 128 (e.g., an MMC file) that corresponds to the studio name, series identifier, and/or region. The MMC data 128 identified by the MMC request handler 130 may be the MMC data 128 included in the package submission 126 that was received from the computing device 140-1 and validated by the ingestion engine 122. The MMC request handler 130 may transmit a response 134 to the computing device 140-2, where the response 134 includes the MMC data 128.

The media platform 104 may be executed by one or more server computers 102. The catalog of media content 144 (including the media content item 144a) may be accessed by a user of a user device 180 according to a variety of different ways. The user device 180 may use a browser application to visit a webpage associated with the media platform 104. In some examples, the user device 180 may execute a media application configured to communicate with the media platform 104, and the user may use the media application to locate the media content item 144a. The media application may be a client-side program configured to render an interface to receive and transmit information from the media platform 104. In some examples, the media application is a streaming application. The user device 180 may be any type of computing device such as a smartphone, a laptop, a desktop, a wearable device (e.g., an argument reality (AR) or virtual reality (VR device), or a television device (e.g., a smart television). As soon as the media content item 144a is published to the media platform 104, the user may view, rent, or purchase the media content item 144a.

In some examples, the user may use the media application, executable by the user device 180, to search for media content items 144a across various streaming platforms (including the media platform 104, which may be considered a particular streaming platform). The media platform 104 may aggregate (e.g., combine, assemble, collect, etc.) information about media content items 144a available for viewing (e.g., streaming, downloading, etc.) from multiple streaming platforms and present the information in a user interface (e.g., a single, unified user interface) so that a user can identify and/or search media content items 144a across various streaming platforms. The media content items 144a may include media content 144 (e.g., TVOD content), which has been validated according to the techniques discussed herein. In some examples, the media content items 144a available for selection may include other media content offered by other streaming platforms that implement their own validation mechanisms. In some examples, the media platform 104 may communicate, over a network 150, with the streaming platforms to identify which media content items 144a are available to be streamed by the user device 180 and identify a set or multiple sets of media content items 144a (e.g., across the various streaming platforms) as recommendations to a user of the media application.

The server computer(s) 102 may include one or more processors and one or more memory devices. The processor(s) may be formed in a substrate configured to execute one or more machine executable instructions or pieces of software, firmware, or a combination thereof. The processor(s) can be semiconductor-based—that is, the processors can include semiconductor material that can perform digital logic. The memory device(s) may include a main memory that stores information in a format that can be read and/or executed by the processor(s). The memory device(s) may include one or more random-access memory (RAM) devices and/or one or more read-only memory (ROM) devices. In some examples (not shown), the memory devices may include external storage, e.g., memory physically remote from but accessible by the server computer 102. The server computer 102 may include one or more modules or engines representing specially programmed software. The memory device(s) may store the database 108, including the database tables 109 and the ingestion database 124. The memory device(s) may store applications (e.g., including an operating system) including executable instructions that, when executed by the processors, cause execution of the operations associated with the media platform 104 and any sub-components of the media platform 104.

A server computer 102 may be computing devices that take the form of a number of different devices, for example a standard server, a group of such servers, or a rack server system. In some examples, a server computer 102 may be a distributed system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

FIG. 2 illustrates a flowchart 200 depicting example operations of a media content processing system. Although the flowchart 200 of FIG. 2 illustrates the operations in sequential order, it will be appreciated that this is merely an example, and that additional or alternative operations may be included. Further, operations of FIG. 2 and related operations may be executed in a different order than that shown, or in a parallel or overlapping fashion. The operations may define a computer-implemented method.

Operation 202 includes receiving, over a network 150, an availability resource 136 from a first computing device (e.g., computing device 152) associated with a studio entity, the availability resource 136 including information about a media content item 144*a* to be available for viewing by users of a media platform 104. Operation 204 includes storing the information of the availability resource 136 in a database 108.

Operation 206 includes receiving, over the network 150, a package submission 126 from a second computing device (e.g., computing device 140-1) associated with a post-production house (PPH) entity, the package submission 126 including media manifest core (MMC) data 128 and one or more media assets 110 associated with the media content item 144*a*. Operation 208 includes executing a plurality of processing operations 142 on the package submission 126, the plurality of processing operations 142 including an error operation (e.g., any one of operations 142-1 through operation 142-5) executed on the package submission 126 using at least one of the information from the availability resource 136 or the MMC data 128. Operation 210 includes, in response to determining that the error operation has resulted in an error, transmitting an error notification 138 to at least one of the first computing device or the second computing device, the error notification 138 including information about the error.

In some aspects, the error operation includes a hierarchical check for episodic content that determines if a series identifier identified in the MMC data corresponds to a series identifier identified in the information from the availability resource. In some aspects, the error operation includes a publication template check that determines whether at least one of a language or rating is valid based on at least one of the MMC data or a territory rule that defines whether a language is allowed in a territory. In some aspects, the error operation includes a superset rule check that determines if a new release in the package submission removes one or more episodes from previously provided content. In some aspects, the operations include, in response to execution of one of the plurality of processing operations, providing, over the network, a status message about a status of the package submission. In some aspects, the error notification includes a selectable link, when selected, causes the first or second computing device to render a user interface to correct the error without causing resubmission of the package submission. In some aspects, the operations include receiving, over the network, an offer request from the second computing device and/or providing, over the network, an offer for display on the second computing device, the offer identifying the media content item. In some aspects, the PPH entity is a first PPH entity, and the operations may include receiving, over a network, an MMC request from a third computing associated with a second PPH entity and transmitting, over the network, a response that includes the MMC data.

In some aspects, the techniques described herein relate to a non-transitory computer-readable medium storing executable instructions that when executed by at least one processor cause the at least one processor to execute operations, the operations including: receiving, over a network, an availability resource from a first computing device associated with a studio entity, the availability resource including information about a media content item to be available for viewing by users of a media platform; storing the information of the availability resource in at least one of a plurality of database tables; receiving, over the network, a package submission from a second computing device associated with a post-production house (PPH) entity, the package submission including media manifest core (MMC) data and one or more media assets associated with the media content item; executing a plurality of processing operations on the package submission, the plurality of processing operations including an error operation executed on the package submission using at least one of the information from the availability resource or the MMC data; and in response to execution of one of the plurality of processing operations, providing, over a network, a status message about a status of the package submission.

In some aspects, the techniques described herein relate to a non-transitory computer-readable medium, wherein the operations further include: in response to determining that the error operation has resulted in an error, transmitting an error notification to at least one of the first computing device or the second computing device, the error notification including information about the error.

In some aspects, the techniques described herein relate to a non-transitory computer-readable medium, wherein the error operation includes a hierarchical check for episodic content that determines if a series identifier identified in the MMC data corresponds to a series identifier identified in the information from the availability resource.

In some aspects, the techniques described herein relate to a non-transitory computer-readable medium, wherein the error operation includes a publication template check that determines whether at least one of a language or rating is valid based on the MMC data. In some aspects, the techniques described herein relate to a non-transitory computer-readable medium, wherein the error operation includes a superset rule check that determines if a new release in the package submission removes one or more episodes from previously provided content. In some aspects, the techniques described herein relate to a non-transitory computer-readable medium, wherein the error notification includes a selectable link, when selected, causes the first or second computing device to render a user interface to correct the error without causing resubmission of the package submission.

In some aspects, the techniques described herein relate to a non-transitory computer-readable medium, wherein the operations further include: receiving, over the network, an offer request from the second computing device; and providing, over the network, an offer for display on the second computing device, the offer identifying the media content item. In some aspects, the techniques described herein relate to a non-transitory computer-readable medium, wherein the operations further include: receiving, over a network, an MMC request from a third computing associated with a second PPH entity; and transmitting, over the network, a response that includes the MMC data.

In some aspects, the techniques described herein relate to an apparatus including: at least one processor; and a non-transitory computer-readable medium storing executable instructions that cause the at least one processor to: receive, over a network, an availability resource from a first computing device associated with a studio entity, the availability resource including information about a media content item to be available for viewing by users of a media platform; store the information of the availability resource in a database; receive, over the network, a package submission from a second computing device associated with a post-production house (PPH) entity, the package submission including media manifest core (MMC) data and one or more media assets associated with the media content item; execute a plurality of processing operations on the package submission, the plurality of processing operations including an error operation executed on the package submission using at least one of the information from the availability resource or the MMC data; and in response to determining that the error operation has resulted in an error, transmit an error notification to at least one of the first computing device or the second computing device, the error notification including information about the error.

In some aspects, the techniques described herein relate to an apparatus, wherein the executable instructions include instructions that cause the at least one processor to: receive, over the network, an offer request from the second computing device; and provide, over the network, an offer for display on the second computing device, the offer identifying the media content item. In some aspects, the techniques described herein relate to an apparatus, wherein the executable instructions include instructions that cause the at least one processor to: receive, over a network, an MMC request from a third computing associated with a second PPH entity; and transmit, over the network, a response that includes the MMC data. In some aspects, the techniques described herein relate to an apparatus, wherein the error notification includes a selectable link, when selected, causes the first or second computing device to render a user interface to correct the error without causing resubmission of the package submission.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or non-transitory medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:

receiving, over a network, an availability resource from a first computing device associated with a first entity, the availability resource including structured data about a media content item to be available for viewing by users of a media platform;

receiving, over the network, a package submission from a second computing device associated with a second entity, the package submission including media manifest core data and a plurality of media files associated with the media content item;

executing a plurality of processing operations on the package submission, the plurality of processing operations including an error operation executed on the package submission using the structured data from the availability resource and the media manifest core data from the package submission; and in response to determining that the error operation has resulted in an error, transmitting an error notification to at least one of the first computing device or the second computing device, the error notification including a selectable link, when selected, causes the first computing device or the second computing device to render a user interface to receive updated data to correct the error, the updated data being applied to the media manifest core data or the structured data of the availability resource without causing resubmission of the package submission.

2. The method of claim 1, wherein the error operation includes a hierarchical check for episodic content that determines if a series identifier identified in the media manifest core data corresponds to a series identifier identified in the structured data from the availability resource.

3. The method of claim 1, wherein the error operation includes a publication template check that determines whether at least one of a language or rating is valid based on at least one of the media manifest core data or a territory rule that defines whether the language is allowed in a territory.

4. The method of claim 1, wherein the error operation includes a superset rule check that determines if a new release in the package submission removes one or more episodes from previously provided content.

5. The method of claim 1, further comprising:

in response to execution of one of the plurality of processing operations, providing, over the network, a status message about a status of the package submission.

6. The method of claim 1, further comprising:

receiving, over the network, a request for offer information from the second computing device; and providing, over the network, an offer generated from the availability resource for display on the second computing device, the offer identifying the media content item to be fulfilled by the package submission.

7. The method of claim 1, further comprising:

receiving, over the network, a request for the media manifest core data from a third computing device associated with a third entity; and transmitting, over the network, a response that includes the media manifest core data, the media manifest core data enabling the third entity to validate the media content item for distribution.

8. A non-transitory computer-readable medium storing executable instructions that when executed by at least one processor cause the at least one processor to execute operations, the operations comprising:

receiving, over a network, an availability resource from a first computing device associated with a first entity, the availability resource including structured data about a media content item to be available for viewing by users of a media platform;

receiving, over the network, a package submission from a second computing device associated with a second entity, the package submission including media manifest core data and a plurality of media files associated with the media content item;

executing a plurality of processing operations on the package submission, the plurality of processing operations including an error operation executed on the package submission using the structured data from the availability resource and the media manifest core data from the package submission; and in response to determining that the error operation has resulted in an error, transmitting an error notification to at least one of the first computing device or the second computing device, the error notification including a selectable link, when selected, causes the first computing device or the second computing device to render a user interface to receive updated data to correct the error, the updated data being applied to the media manifest core data or the structured data of the availability resource without causing resubmission of the package submission.

9. The non-transitory computer-readable medium of claim 8, wherein the operations further comprise:

in response to execution of one of the plurality of processing operations, providing, over the network, a status message about a status of the package submission to at least one of the first computing device or the second computing device.

10. The non-transitory computer-readable medium of claim 8, wherein the error operation includes a hierarchical check for episodic content that determines if a series identifier identified in the media manifest core data corresponds to a series identifier identified in the structured data from the availability resource.

11. The non-transitory computer-readable medium of claim 8, wherein the error operation includes a publication template check that determines whether at least one of a language or rating is valid based on the media manifest core data.

12. The non-transitory computer-readable medium of claim 8, wherein the error operation includes a superset rule check that determines if a new release in the package submission removes one or more episodes from previously provided content.

13. The non-transitory computer-readable medium of claim 8, wherein the operations further comprise:

receiving, over the network, a request for offer information from the second computing device; and providing, over the network, an offer generated from the availability resource for display on the second computing device, the offer identifying the media content item to be fulfilled by the package submission.

14. The non-transitory computer-readable medium of claim 8, wherein the operations further comprise:

receiving, over the network, a request for the media manifest core data from a third computing device associated with a third entity; and transmitting, over the network, a response that includes the media manifest core data, the media manifest core data enabling the third entity to validate the media content item for distribution.

15. An apparatus comprising:

at least one processor; and a non-transitory computer-readable medium storing executable instructions that cause the at least one processor to:

receive, over a network, an availability resource from a first computing device associated with a first entity, the availability resource including structured data about a media content item to be available for viewing by users of a media platform;

receive, over the network, a package submission from a second computing device associated with a second entity, the package submission including media manifest core data and a plurality of media files associated with the media content item;

execute a plurality of processing operations on the package submission, the plurality of processing operations including an error operation executed on the package submission using the structured data from the availability resource and the media manifest core data from the package submission; and in response to determining that the error operation has resulted in an error, transmit an error notification to at least one of the first computing device or the second computing device, the error notification including a selectable link, when selected, causes the first computing device or the second computing device to render a user interface to receive updated data to correct the error, the updated data being applied to the media manifest core data or the structured data of the availability resource without causing resubmission of the package submission.

16. The apparatus of claim 15, wherein the executable instructions include instructions that cause the at least one processor to:

receive, over the network, a request for offer information from the second computing device; and provide, over the network, an offer generated from the availability resource for display on the second computing device, the offer identifying the media content item to be fulfilled by the package submission.

17. The apparatus of claim 15, wherein the executable instructions include instructions that cause the at least one processor to:

receive, over the network, a request for the media manifest core data from a third computing associated with a third entity; and transmit, over the network, a response that includes the media manifest core data, the media manifest core data enabling the third entity to validate the media content item for distribution.

\* \* \* \* \*